United States Patent
Katou et al.

(10) Patent No.: US 6,960,982 B2
(45) Date of Patent: Nov. 1, 2005

(54) ELECTRONIC CONTROL UNIT FOR VARIABLE PWM COMMUNICATION

(75) Inventors: Tatsuya Katou, Nukata-gun (JP); Yasushi Kanda, Kariya (JP); Kazuhiro Nakashima, Kariya (JP)

(73) Assignee: Denso Corporation, Kariya (JP)

( * ) Notice: Subject to any disclaimer, the term of this patent is extended or adjusted under 35 U.S.C. 154(b) by 575 days.

(21) Appl. No.: 09/940,572

(22) Filed: Aug. 29, 2001

(65) Prior Publication Data

US 2002/0030586 A1 Mar. 14, 2002

(30) Foreign Application Priority Data

Sep. 8, 2000 (JP) ........................................ 2000-273825

(51) Int. Cl.$^7$ ............................ H04Q 1/00; G05B 19/00
(52) U.S. Cl. ................................ 340/5.72; 340/825.63; 340/5.61; 340/10.3
(58) Field of Search .......................... 340/825.63, 10.3, 340/5.72, 5.61, 5.62, 5.63, 5.64, 10.1, 10.2, 10.34, 870.31; 307/10.5, 10.2; 375/238; 332/109

(56) References Cited

U.S. PATENT DOCUMENTS 4,509,093 A    4/1985  Stellberger
5,345,231 A *  9/1994  Koo et al. ............. 340/870.31
5,790,014 A *  8/1998  Campbell et al. ........ 340/10.34
6,023,199 A *  2/2000  Cheung ...................... 332/109
6,323,566 B1 * 11/2001  Meier ........................ 307/10.2
6,366,197 B1 *  4/2002  Tarquinio .............. 340/426.16

FOREIGN PATENT DOCUMENTS

| JP | U-2-107674 | 8/1990 |
| JP | A-7-170581 | 7/1995 |
| JP | A-8-149126 | 6/1996 |

* cited by examiner

Primary Examiner—Edwin C. Holloway, III
(74) Attorney, Agent, or Firm—Posz Law Group, PLC

(57) ABSTRACT

An electronic key entry system for vehicles has a security ECU mounted in a vehicle for checking an electronic key via radio communication with the same. The ECU includes a CPU and a PWM output unit. The PWM output unit generates an interrupt request at every edge time of PWM pulse transmitted to the electronic key. The CPU sets a pattern of PWM output of a next cycle in response to the interrupt request so that the PWM output unit transmits a pulse corresponding to the set PWM output pattern. The CPU also stops pulse transmission, when no response is received from the electronic key in the course of communication in a plurality of stages.

13 Claims, 5 Drawing Sheets

ELECTRONIC CONTROL UNIT FOR VARIABLE PWM COMMUNICATION

CROSS REFERENCE TO RELATED APPLICATION

This application is based on and incorporates herein by reference Japanese Patent Application No. 2000-273825 filed Sep. 8, 2000.

BACKGROUND OF THE INVENTION

The present invention relates to an electronic control unit which communicates with external devices, and more particularly to an in-vehicle electronic control unit which executes data communication with a portable transmitter/receiver such as a hand-carried electronic key.

Microcomputers generally have communication functions (communication resources) such as a universal asynchronous receiver transmitter (UART) and a serial communication I/F. Since this type of communication is executed by using Non-Return-to-Zero (NRZ) coding system, it is difficult to synchronize signals. As a result, this type of communication is not suitable for a wireless communication which has a large data length and no clock lines.

It is proposed to realize a radio communication by using PWM (pulse-width-modulation)-type data communication system. Since the PWM-type communication system generates an edge for each bit, it is easy to synchronize signals. In this communication, a microcomputer uses a PWM data communication circuit (PWM communication resource) so that a data train is converted into an output pattern having a predetermined pulse width and transmitted to external devices. However, the PWM data communication circuit requires additional circuits and its circuit size becomes large and complicated. Further, the output pattern is necessarily limited. Costs will increase when the output pattern is made variable.

SUMMARY OF THE INVENTION

It is therefore an object of the present invention to provide an electronic control unit which is capable of varying its output pattern while using a general function of PWM-type communication system.

According to the present invention, an electronic control unit for communication with an external unit includes a PWM output unit for generating pulses each of which has a predetermined on-period and a predetermined off-period. The electronic control unit further includes a setting unit for executing an interrupt process at an edge time of each of the pulses and setting in the interrupt process a pulse-width-modulated output pattern of the data signal which is to be transmitted thereafter.

Preferably, the setting unit variably sets at least one of a cycle period, an on-period and an off-period of a next pulse. The PWM output unit generates an interrupt request between two successive pulses, and the setting unit executes the interrupt process in response to the interrupt request. The setting unit checks, when the interrupt request is generated, whether a response has been received from the external unit. The setting unit disables a code transmission in a next stage when no response from the external unit has been received.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described with reference to an embodiment which is directed to an electronic key entry system for vehicles. In this system, an electronic key is used as an portable transmitter/receiver (external device) to lock and unlock vehicle doors and enable and disable engine starting. Further, the electronic key communicates with an in-vehicle electronic control unit (ECU) to execute a key check operation to determine whether the electronic key is present outside or inside a vehicle based on the result of communication.

Figure 1:
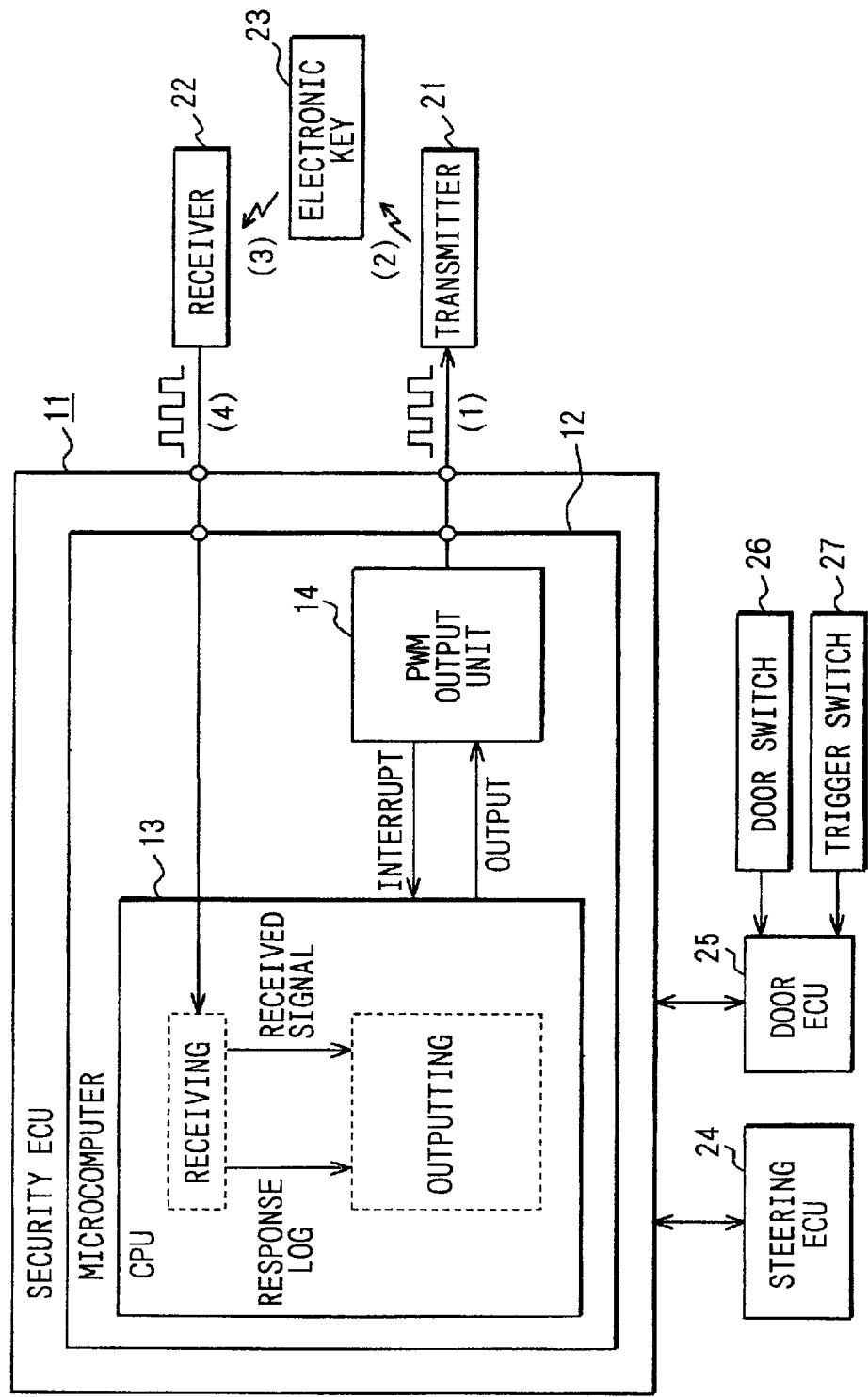
FIG. 1 is a block diagram showing an electronic key entry system according to an embodiment of the present invention.

Referring to FIG. 1, an electronic key entry system includes a security ECU 11 which is mounted in a vehicle. The ECU 11 is connected to a transmitter 21 and a receiver 22 to execute a radio communication with an electronic key 23 specific to each vehicle. The ECU 11 is programmed to execute a key check operation by the radio communication with the electronic key 23 through the transmitter 21 and the receiver 22. The transmitter 21 is installed on a door or a trunk gate of the vehicle. The transmitter 21 has an outside antenna for transmitting radio signals toward the vehicle outside and an inside antenna for transmitting radio signals toward the vehicle inside.

The ECU 11 is primarily comprised of a microcomputer 12. The microcomputer 12 includes a CPU 13 for controlling communication with the electronic key 23 and a pulse-width-modulation (PWM) output unit 14 for generating pulses as communication data. This PWM output unit 14 is in a general-type, which is normally used in a microcomputer. This general PWM output unit 14 generates a train of pulses in a fixed duty ratio for regulating the volume of buzzers or the brightness of lights in a vehicle application.

The CPU 13 executes a signal receiving process for receiving signals from the receiver 22 and analyzing the received signals. The CPU 13 also executes an outputting process for setting output patterns of codes. The PWM output unit 14 generates pulses which have predetermined on-period and off time based on the output pattern defined by the CPU 13, and outputs the same to the transmitter 21.

The PWM output unit 14 generates an interrupt request to the CPU 13 at every edge of the pulse, and the CPU 13 sets the PWM output pattern in response to each interrupt request.

Figure 2:
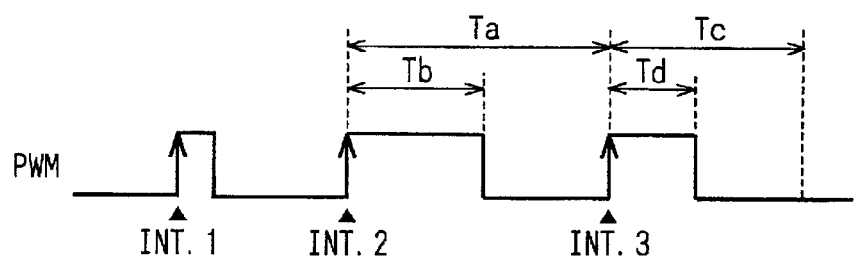
FIG. 2 is a signal diagram showing a waveform of pulse output from a security ECU used in the embodiment shown in FIG. 1.

Specifically, when the pulses are outputted as shown in FIG. 2, the interrupt request is generated at each rising edge and the CPU 13 sets the PWM output pattern of the next cycle. For instance, the CPU 13 determines the cycle time Ta and the on-period Tb of the next cycle in response to the first interrupt request (INT. 1), and the cycle time Tc and the on-period Td of the succeeding cycle in response to the second interrupt request (INT. 2). Alternatively, the CPU 13.may determine the on-period and off-time of each pulse.

The PWM output unit 14 may generate the interrupt request to the CPU 13 at every falling edge of the pulses.

The security ECU 11 is also connected to a steering ECU 24 and a door ECU 25. The steering ECU 24 is for controlling locking of a vehicle steering wheel, and the door ECU 25 is for controlling locking and unlocking of vehicle doors. The door ECU 25 is connected to door switches 26 and a trigger switch 27. The door switches 26 are for detecting opening/closing of the respective doors, and the trigger switch 27 is for starting a key check operation when manipulated by a vehicle user. Output signals of those switches 26 and 27 are applied to the security ECU 11 through the door ECU 25.

In this electronic key entry system, the security ECU 11 executes the key check operation based on various signals applied from the door switches 26, the trigger switch 27 and the like. For checking whether the electronic key 23 is an authorized one for the vehicle, the trigger switch 27 is manipulated by a vehicle user. The security ECU 11 outputs code information (1) to the transmitter 21, and the transmitter 21 generates a radio signal as an inquiry signal (2) from its antennas in correspondence with the received code information.

The inquiry signal (2) is received by the electronic key 23, if the vehicle user carrying the electronic key 23 is near the vehicle. The electronic key 23 in return generates a radio signal as a response signal (3) when receiving the inquiry signal (2). The receiver 22 shapes the response signal (3) and outputs a shaped response signal (4) to the ECU 11. The ECU 11 checks whether the electronic key 23 is the authorized one based on the response signal (4) to automatically unlock the doors or enable engine starting.

Figure 3:
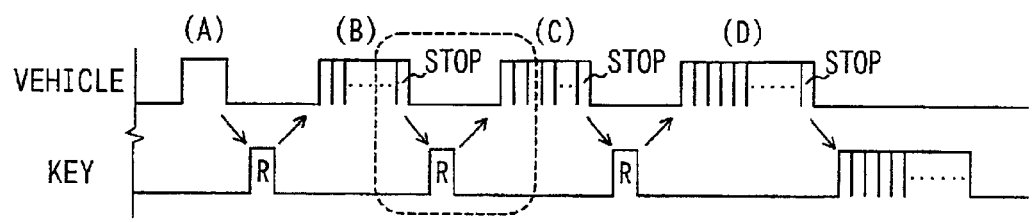
FIG. 3 is a signal diagram showing a key check operation of the embodiment.

The key check operation by the security ECU 11 is executed in four stages as shown in FIG. 3. In the first stage (A), the ECU 11 (vehicle side) transmits an electronic key activation signal (A). If a response signal (R) is received from the electronic key 23, the ECU 11 determines that the vehicle user (electronic key 23) is near the vehicle. In the second stage, the ECU 11 transmits a vehicle code signal (B). If a response signal (R) is received from the electronic key 23, the electronic key 23 checks whether the vehicle code included in the signal (B) coincides with its vehicle code. The electronic key 23 transmits a response signal (R) if both codes are the same.

In the third stage (3), the ECU 11 transmits a key code signal (C). In case that the ECU 11 has a plurality of registered key codes in correspondence with a plurality of electronic keys (original and spare), the key code signal (C) includes all the registered key codes. The electronic key 23 checks whether one of the key codes coincides with its key code. The electronic key 23 transmits a response signal (R) if both codes are the same.

In the fourth stage, the ECU 11 transmits a random number code signal (D). The electronic key 23 encrypts the received code and transmits the encrypted code as a response signal (R). The ECU 11 decrypts the encrypted code and checks whether the decrypted code coincides with the original code. The ECU 11 determines that the electronic key 23 is the authorized one registered for the vehicle.

In the above operation, each signal (B)–(D) generated in the second to fourth stages has the stop bit at the end. The ECU 11 proceeds from one stage to the next stage in sequence in the following manner, only when the response signal (R) is received within a predetermined time interval.

Figure 4:
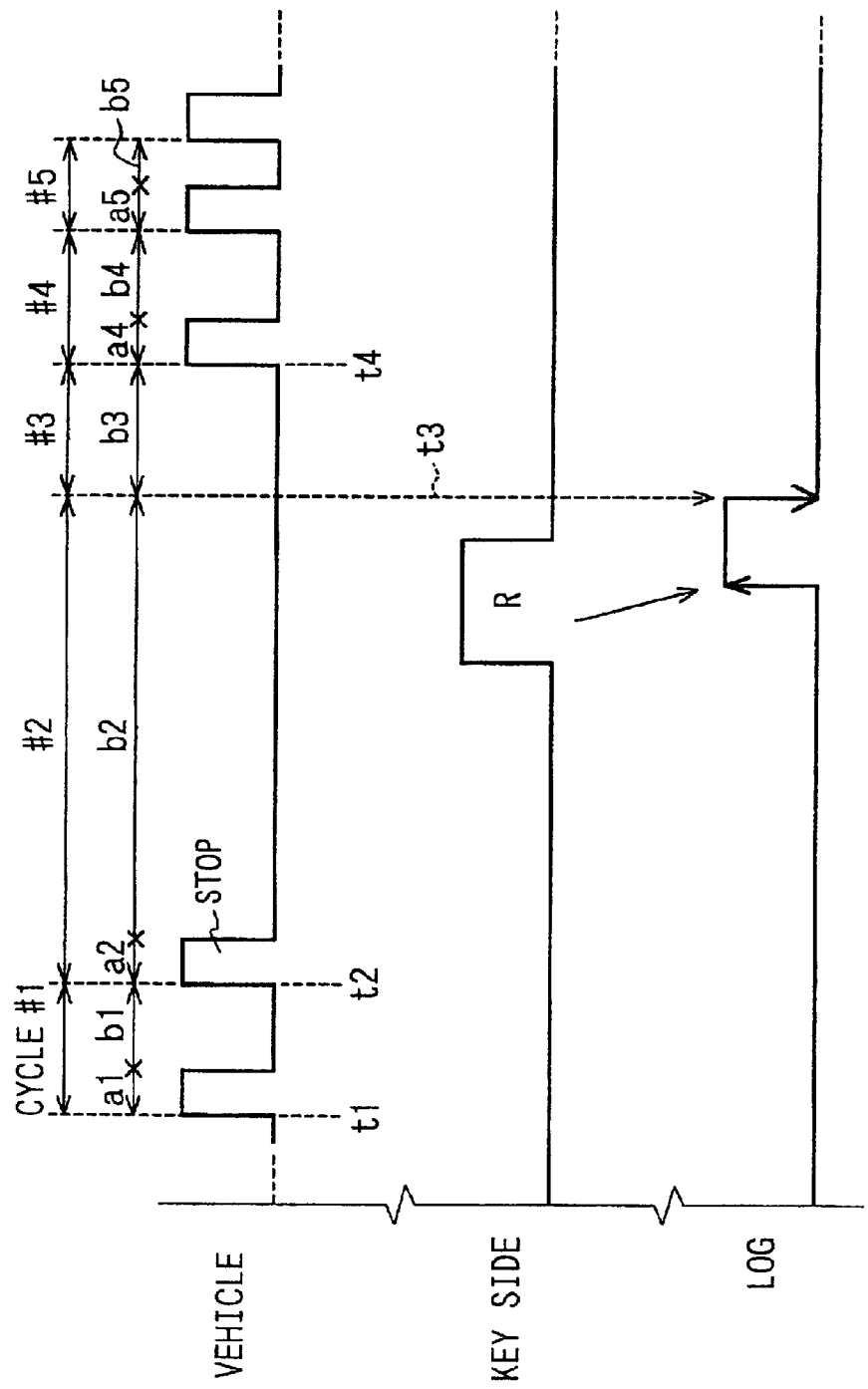
FIG. 4 is a signal diagram showing a data transmission/reception operation of the embodiment.

FIG. 4 shows a signal transmission and reception from the second stage to the third stage. This corresponds to a time domain indicated by a dotted line in FIG. 3. As shown in FIG. 4, the ECU 11 sets a log or history indicative of the response signal from the electronic key 23 transmitted in response to the vehicle code signal (B) of the second stage. The ECU 11 proceeds to the third stage only when this log is confirmed.

In FIG. 4, the data transmitted from the vehicle side is shown as cycles #1 to #5 for simplicity. The interrupt request is applied to the CPU 13 at each edge time which defines a start of each cycle #1 to #5. Specifically, the CPU 13 sets, in response to the interrupt request at time t1, the output pattern of the cycle #2 which comprises an on-period a2 and an off-period b2, so that a stop bit of the vehicle code signal is outputted in the second stage. The CPU 13 then sets, in response to the next interrupt request, the output pattern which comprises an on-period zero (0) and an off-period b3 of the cycle so that a next interrupt request for checking the log of response is generated. Thus, a dummy signal which is fixed to the off-level (duty ratio=0%) is outputted in the cycle #3, so that time t3 is defined as an imaginary edge time by the dummy signal.

The CPU 13 checks, in response to the interrupt request at time t3, whether the log of response indicative of the response from the electronic key 23 is available. The CPU 13 continues subsequent data transmission only when the log of response is confirmed. The CPU 13 sets, in response to the interrupt request at time t3, sets the output pattern of the cycle #4 which comprises an on-period a4 and an off-period b4, so that the first bit of the key code signal (C) in the third stage is set. The CPU 13 then sets, in response to the interrupt request at time t4, the output pattern of the cycle #5 which comprises an on-period a5 and an off-period b5.

Figure 5:
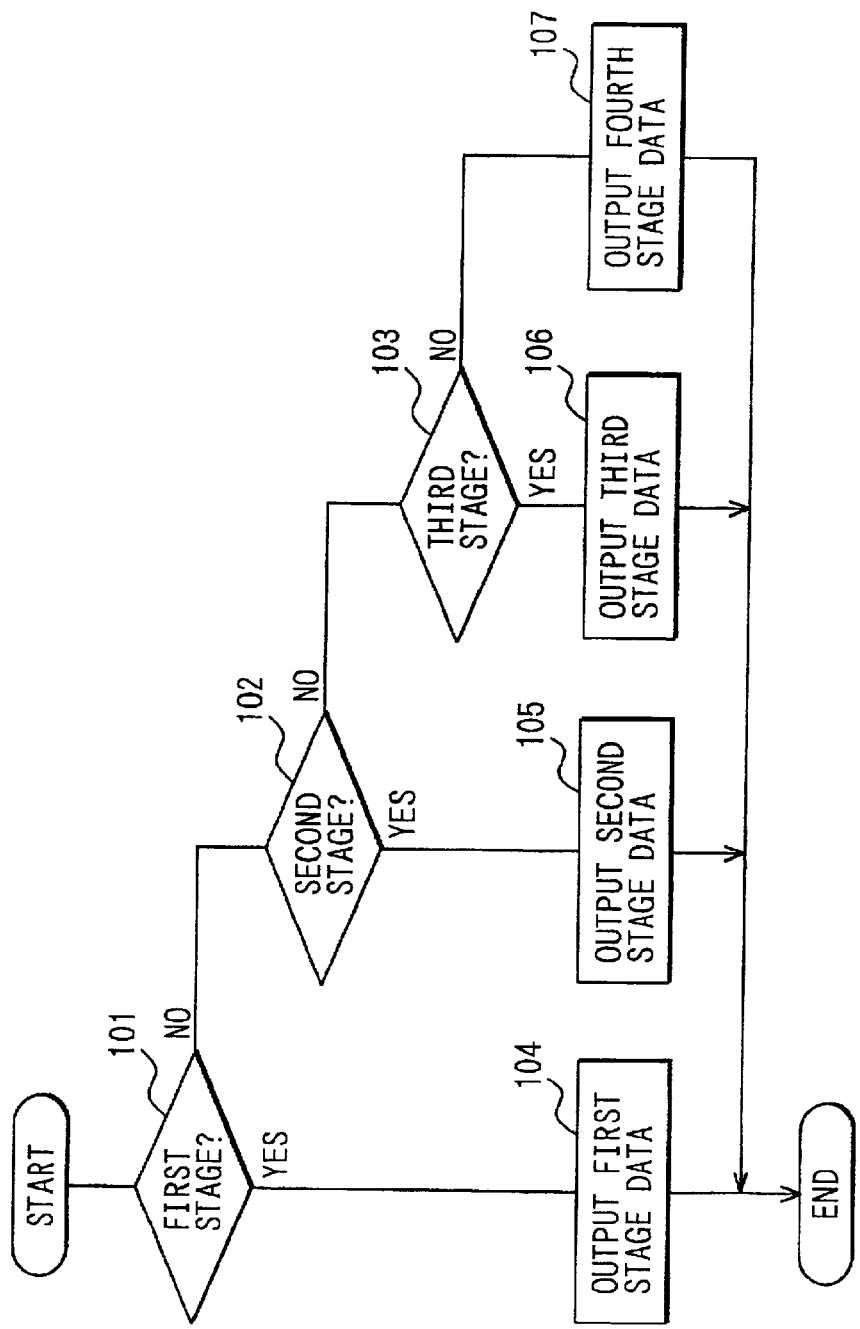
FIG. 5 is a flow diagram showing a data output process executed in the embodiment.

The data output process in the above key check operation executed by the security ECU 11 (CPU 13) is shown in FIG. 5. This process is executed at every predetermined interval.

The CPU 13 determines at steps 101–103 which one of the four stages it is at that moment. If it is the first stage, the CPU 13 executes the data output process for the first stage at step 104 so that the electronic key activation signal (A) in FIG. 3 is transmitted. The CPU 13 executes the data output processes for the second to fourth stages at steps 105–107, respectively, so that the vehicle code signal, the key code signal and the random number code signal are transmitted in sequence.

Figure 6:
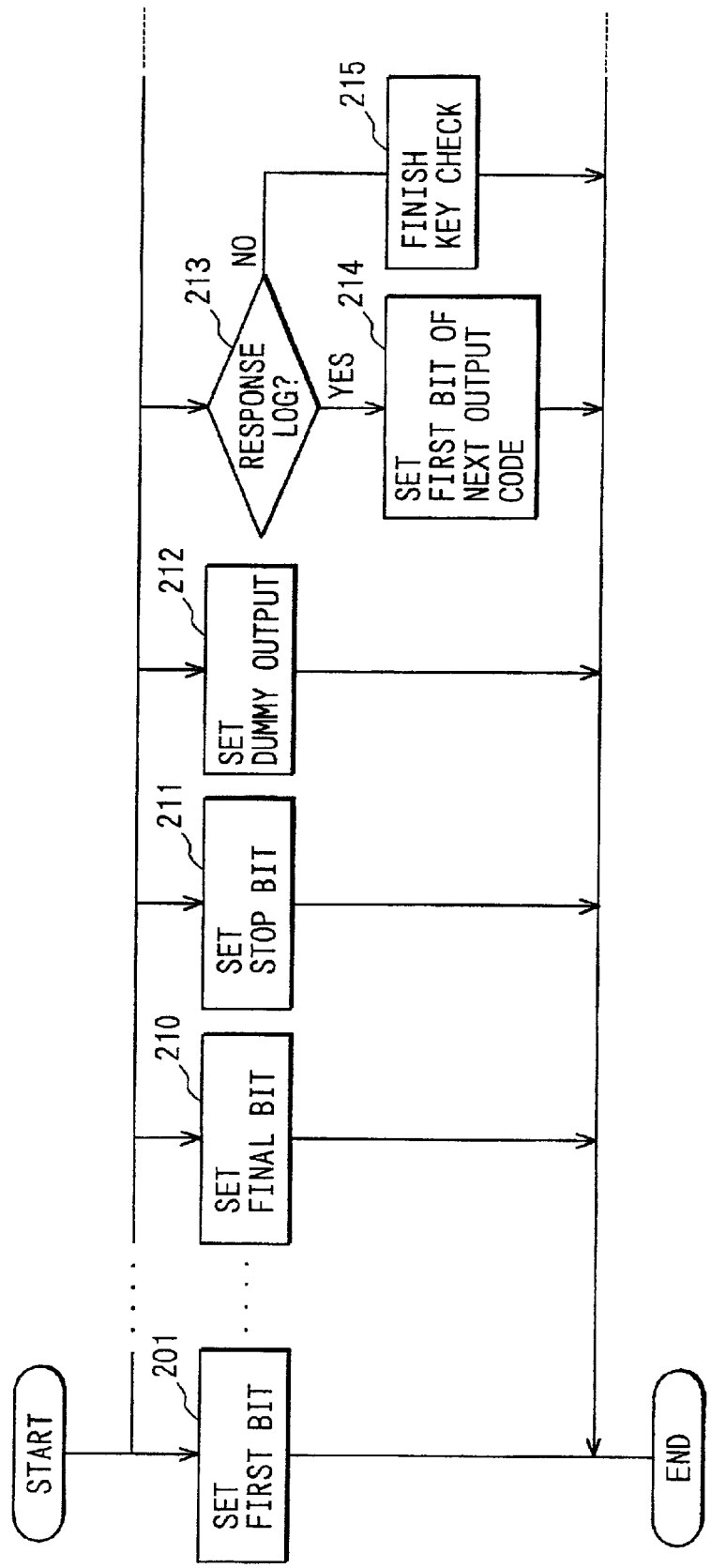
FIG. 6 is a flow diagram showing an interrupt process executed in the embodiment.

The interrupt process of the CPU 13 initiated at each edge time of the PWM output signal is shown in FIG. 6. In this process, steps 201–215 are selectively executed corresponding to each edge time.

Specifically, the CPU 13 sets the first to end bits of each output code signal (A)–(D) in sequence at steps 201–210, respectively. The CPU 13 sets the stop bit at step 211. The CPU 13 then sets at step 212 the dummy output to define the interrupt time for checking the log of response. The dummy output is fixed to the off level (duty ratio is 0%).

In this case, CPU 13 executes steps 213–215 at the imaginary edge time of the dummy output. That is, the CPU 13 checks at step 213 whether the log of response is available. If it is available, the CPU 13 sets the first bit of the next output code at step 214 so that the key check operation is continued. If it is not available, however, the CPU 13 finishes the key check operation at step 215.

For instance, the interrupt for step 211 is initiated at time t1 in FIG. 4. The interrupt for step 212 is initiated at step 212. Further, the interrupt for steps 213–215 is initiated.

In the above embodiment, the output patterns of data train are set in response to interrupt requests at the edge time of the PWM output. Thus, the pulse waveform of output signals transmitted from the vehicle side can be varied with ease in correspondence with the train of data to be transmitted. That is, the train of data to be transmitted can be converted to the PWM output arbitrarily. As a result, the data transmission can be performed appropriately under the PWM-type communication system using the general PWM output unit 14.

The response from the electronic key 23 is confirmed with reference to the log of response each time the code signals of one stage are transmitted, and the code signal is transmitted in the next stage only when the response from the electronic key 23 is confirmed. Since the data transmission from the vehicle side is disabled when no response from the electronic key 23 is received, unnecessary data communication is avoided and the electric power consumption in the vehicle is reduced.

The interrupt request for checking the log of response is generated in timed relation with the imaginary edge time of the dummy signal. As a result, the interrupt request can be generated appropriately without generating any extra pulses which impede normal communication.

The above embodiment may be modified in various ways without departing from the spirit of the invention. For instance, the data transmission from the vehicle side may be continued or stopped by monitoring the communication operation of the security ECU 11 or detecting opening of the vehicle doors, in place of generating the intentional interrupt request (time t3 in FIG. 4) and checking the log of response from the electronic key 23.

Data transmission mode determined in response to the intentional interrupt request may be changed to alter the content of data to be transmitted in place of continuing or stopping the data transmission. In this case, the data transmission mode can be controlled arbitrarily.

The ECU 11 may communicate with a fixed-type computer in place of the portable transmitter/receiver (electronic key 23). Further, the ECU 11 may communicate with other computers through a signal transmission line.

What is claimed is:

1. An electronic control unit for transmitting pulse-width-modulated data signal for communicating with an external unit comprising:

a PWM output unit for generating pulses each of which has an on-period and an off-period;

a setting unit for executing an interrupt process at an edge time of each of the pulses and setting in the interrupt process a pulse-width-modulated output pattern of the data signal which is to be transmitted thereafter, wherein the setting unit variably sets a cycle period of the pulses for each cycle of the pulses.

2. An electronic control unit as in claim 1, wherein:

the setting unit variably sets both the cycle period and the on-period of a next cycle of the pulses.

3. An electronic control unit as in claim 1, wherein:

the PWM output unit generates an interrupt request between two successive pulses; and the setting unit executes the interrupt process in response to the interrupt request.

4. An electronic control unit as in claim 3, wherein:

the setting unit checks, when the interrupt request is generated, whether a response has been received from the external unit.

5. An electronic control unit as in claim 3, wherein:

the PWM output unit generates a dummy signal fixed to an off level and generates the interrupt request at an imaginary edge time of the dummy signal.

6. The electronic control unit as in claim 1, wherein:

the setting unit drives the PWM output unit to transmit the pulses in a plurality of stages to the external unit, the pulses being codes specific to a vehicle to check whether the external unit is authorized;

the setting unit checks whether a response from the external unit has been received at every stage of code transmission; and the setting unit disables a code transmission in a next stage when no response from the external unit has been received.

7. A communication method between a vehicle and a portable transmitter/receiver unit comprising the steps of:

transmitting, in each of a plurality of transmission stages, a transmission signal from an in-vehicle computer having a pulse-width-modulation output unit for checking authority of the transmitter/receiver;

generating an interrupt request each time an inquiry signal is transmitted; and variably setting a pattern of the transmission signal in response to the interrupt request by changing at least a cycle period of a next transmission signal, so that the variably set next transmission signal is generated from the pulse-width-modulation output unit to the transmitter/receiver unit.

8. A communication method as in claim 7, further comprising the steps of:

transmitting a response signal from the portable transmitter/receiver unit in response to a completion of signal transmission of each stage from the vehicle; and stopping a transmission of transmission signals from the vehicle when no response signal is received from the portable transmitter/receiver unit.

9. A communication method as in claim 7, wherein:

the transmission signal transmitting step transmits a plurality of transmission signals in each stage; and the pattern setting step sets the pattern of each transmission signal in each stage.

10. An electronic control unit for an electronic key entry system, comprising:

a central processing unit (CPU) for controlling communication with an electronic key by generating a data output pattern; and a pulse width modulation (PWM) output unit in communication with the CPU for generating communication data pulses having a predetermined on period and a predetermined off time based on the data output pattern generated by the CPU, and for generating interrupt requests for output to the CPU at respective edges of each of the communication data pulses, wherein the CPU variably sets the data output pattern in response to each of the interrupt requests.

11. The electronic control unit of claim 10, wherein the PWM output unit is for generating the interrupt requests for output to the CPU at respective rising edges of each of the communication data pulses.

12. The electronic control unit of claim 10, wherein the PWM output unit is for generating the interrupt requests for output to the CPU at respective falling edges of each of the communication data pulses.

13. The electronic control unit of claim 10, wherein the CPU is further for maintaining a log of responses from the electronic key and continues generating the data output pattern only when the log indicates that a response has been received.

* * * * *